United States Patent [19]
Mace et al.

[11] 3,817,965

[45] June 18, 1974

[54] POLYMERIZATION OF VINYL COMPOUNDS IN SUSPENSION

[75] Inventors: Jacques Mace, Versailles; Philippe Hubin Eschger, Bizanos, both of France

[73] Assignee: Societe Nationale Des Petroles D'Aquitaine, Courbevoie, France

[22] Filed: Jan. 3, 1972

[21] Appl. No.: 214,640

Related U.S. Application Data

[63] Continuation-in-part of Ser. No. 816,859, Feb. 24, 1969, abandoned.

[30] Foreign Application Priority Data

Feb. 27, 1968 France .......................... 68.141341

[52] U.S. Cl. 260/93.5 W, 260/85.5 HC, 260/85.5 P, 260/86.7, 260/87.5 R, 260/88.1 P, 260/88.2 C, 260/91.5

[51] Int. Cl. ...... C08f 7/04, C08f 15/02, C08f 15/04

[58] Field of Search .................. 260/93.5 W, 88.1 P

[56] References Cited
UNITED STATES PATENTS

| | | | |
|---|---|---|---|
| 2,656,334 | 10/1953 | D'Alelio | 260/93.5 W |
| 2,907,756 | 10/1959 | Doak | 260/93.5 W |
| 3,036,053 | 5/1962 | Doak | 260/93.5 W |
| 3,425,966 | 2/1969 | Ronden et al. | 260/93.5 W |
| 3,480,606 | 11/1969 | Thomas | 260/85.5 P |

*Primary Examiner*—Harry Wong, Jr.
*Attorney, Agent, or Firm*—Ostrolenk, Faber, Gerb & Soffen

[57] ABSTRACT

High molecular weight vinyl polymers are rapidly prepared by forming an aqueous suspension of the vinyl monomer and at least one free radical catalyst having a polymerization rate at a first polymerization temperature which is 2 to 20 times higher than thermal polymerization thereat and the most unstable catalyst having a half-life of 2 to 8 hours thereat, raising the temperature to a second polymerization temperature at which the most unstable catalyst in the suspension has a half-life of less than 1 hour, and recovering the resulting high molecular weight polymer.

10 Claims, 1 Drawing Figure

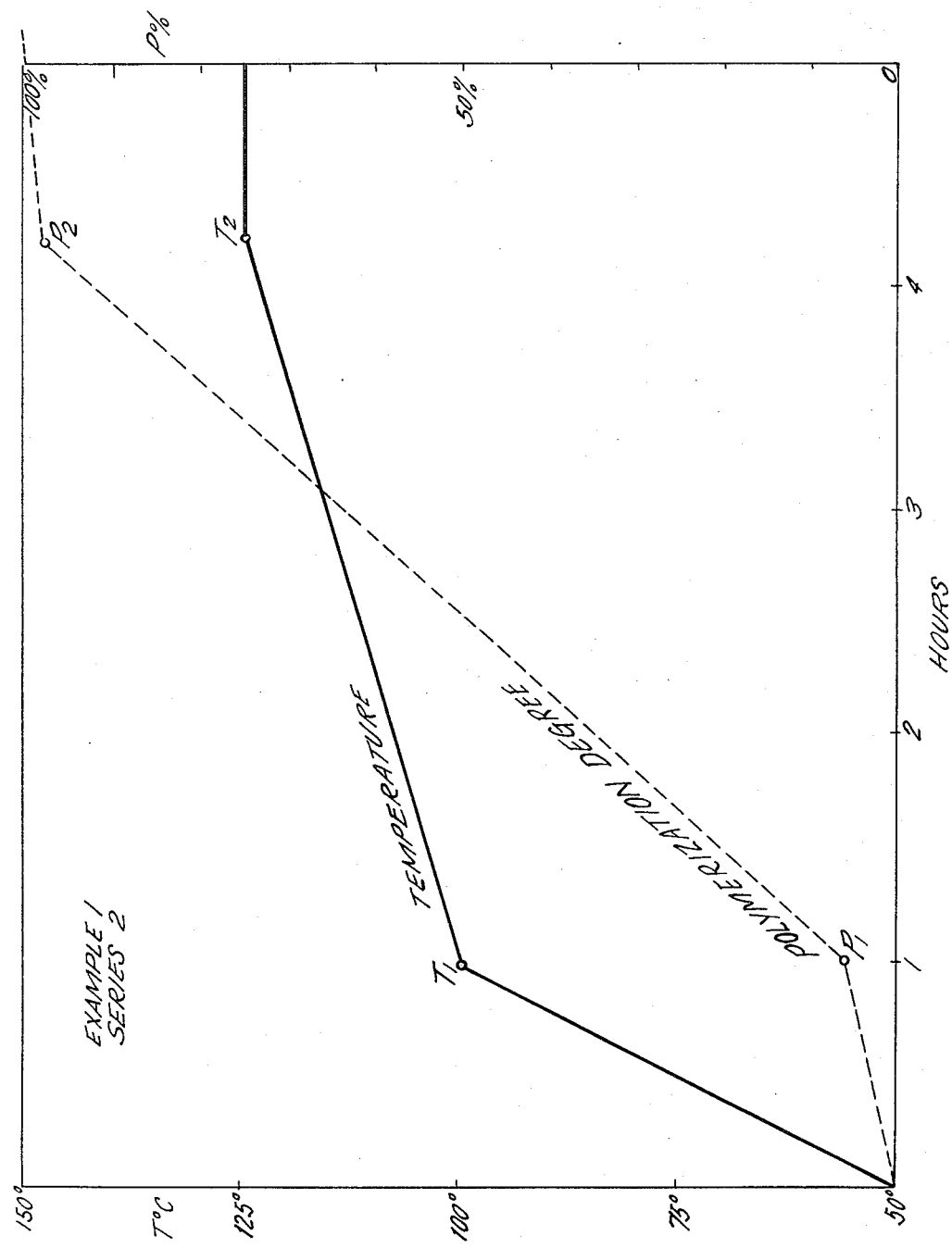

POLYMERIZATION OF VINYL COMPOUNDS IN SUSPENSION

The present application is a continuation-in-part application of Ser. No. 816,859 filed Feb. 24, 1969, now abandoned.

The present invention relates to the polymerization of one or several vinyl compounds in aqueous suspension; it is more particularly concerned with an improvement in the manufacture of homopolymers or copolymers of aromatic vinyl hydrocarbons, particularly of styrene and its homologues and derivatives.

Suspension polymerization is a very advanced procedure at the present time, and it is known to manufacture polymers of good quality, particularly from styrene, α-methylstyrene, chlorostyrene, etc., optionally with comonomers such as acrylonitrile or others. However, when it is a matter of producing such polymers on a large scale, it is found to be necessary to use numerous reactors in highly cumbersome installations, because the production per unit of capacity of a reactor is fairly small for the known processes. The reason for this is that the speed of polymerization is limited to less than 20 percent per hour, mainly because of the thermal and catalytic effects which are implied by the polymerization; the use of high-capacity reactors encounters difficulties as regards elimination of the heat, which cause a lowering of the qualities of the polymer; on the other hand, it is known that the increase in the polymerization speed is expressed by a fall in the molecular weight of the polymer.

The new process according to the invention overcomes this defect of the prior art; it permits the production of a polymer of the required quality, using the best possibilities of each reactor, and regardless of the capacity of the latter. This means to say that, for any reactor capacity, it becomes possible to adopt the maximum reaction speed which is compatible with the elimination of the heat units. This possibility of adaptation has so far been prohibited by the factors referred to above. Thus, by using the improvement according to the invention, it is possible, for example, to achieve the polymerization of styrene compounds at a speed of 20 percent to 40 percent per hour, in reactors of about 80 to 10 cubic meters, or at a speed of 14 percent to 20 percent per hour, when the capacities are of the order of 150 to 80 cubic meters; consequently, it is possible to ensure a considerably increased and optimal hourly production, without any harm to the qualities of the polymers, and even with better qualities; such performances were quite impossible within the scope of the prior art.

Thus, while polymers having a viscosity of at least 5 centistokes, when measured in an 8 percent solution in toluene at 25° C., are easily and rapidly obtained by the method of the invention, this method is particularly useful for the production of polymers exhibiting viscosities of about 9 to about 50 centistokes, and more especially 10 to 25 centistokes, the mechanical and rheological qualities of which are better than those of corresponding conventional polymers.

The unexpected technical advance which is achieved by the present invention results from a very special combination of some of the factors which govern the process of suspension polymerization; it is particularly due to an unexpected choice of the relationships between the nature of the catalysts, the temperatures and the method of heating.

The process according to the invention comprises:

a. forming an aqueous suspension of styrene and 0.01 to 1 weight percent of at least one free radical catalyst exerting a polymerization rate, at a first polymerization temperature $T_1$ of 100° to 150° C., which is 2 to 20 times higher than the thermal polymerization at such temperature, the most unstable catalyst in the suspension having a half-life of 2 to 8 hours at $T_1$;

b. rapidly heating the suspension to said first polymerization temperature $T_1$;

c. before 10 percent of the styrene has been polymerized, raising the temperature of the suspension substantially linearly to a second polymerization temperature $T_2$ of 120° to 160° C. at which the most unstable catalyst in the suspension has a half-life of less than 1 hour; and d. regulating the temperature rise from $T_1$ to $T_2$ such that at least 75 percent of the styrene has been polymerized when the temperature $T_2$ is reached, the velocity of heating the suspension, during said time, being such that polymerization rate is about 20 percent to about 50 percent per hour.

In one preferred form of the invention, there is no temperature level at $T_1$. In any event, it is necessary to start raising the temperature from $T_1$ to $T_2$ while the conversion of the monomer into polymer has not exceeded 10 percent. Depending on the nature and concentration of catalyst, the value of $T_1$, the presence or absence of an inhibitor in the styrene used, as well as the velocity of heating the suspension up to $T_1$, the degree of polymerization present when the raising of the temperature from $T_1$ to $T_2$ is begun can vary from 0 to 10 percent; in industrial working this degree is generally of 1 to 10 percent. In one preferred form of the invention, there is no necessity for holding the temperature at $T_1$ for any period of time and heating the suspension to $T_2$ is begun as soon as $T_1$ is attained. As shown below, $T_1$ is the temperature at which a sharp decrease occurs in the velocity of the temperature rise of the polymerization medium.

Organic peroxides or azo compounds are suitable as radical catalysts. It is preferred to use catalysts whose half-life time, determined in benzene, is from 2½ to 6 hours at the initial polymerization temperature ($T_1$).

The rapid heating of the reaction medium from its initial temperature up to $T_1$ is generally effected at a rate of 20° C. to 100° C. increase per hour, and preferably by 40° to 90° C. per hour; of course, these figures may vary depending on the initial temperature of the suspension, which may be room temperature, subambient or somewhat elevated temperature.

The raising of the temperature from $T_1$ to $T_2$ is progressive and depending on circumstances, $T_2$, which is higher than 100° C., can reach 120° to 160° C. The time taken for raising the temperature from $T_1$ to $T_2$ can vary according to the nature and the proportion of catalyst; it is usually of the order of 1 to 6 hours. More often than not, the rate of the progressive, substantially linear, heating from $T_1$ to $T_2$ is 3°–15° C. per hour, and preferably 4°–10° C. per hour; it is adjusted such that the polymerization rate during this heating period is about 20 percent to about 50 percent per hour. When $T_2$ is reached, the total degree of polymerization of the initial monomer is generally 75%–99% and preferably 90%–99%.

If it is desired to complete the polymerization, the suspension is further heated at $T_2$. As regards the time during which the suspension is maintained at the temperature $T_2$, it must be sufficient to achieve the polymerization, and this usually takes half to 3 hours.

$T_2$ is chosen so that the catalyst, which had a half-life time of 2½ to 6 hours at $T_1$, does not have more than a half-life time of 2 to 30 minutes at $T_2$.

When the aforementioned conditions are satisfied, the speed of polymerization can be regulated to the required value, more especially from 20% to 50% per hour, by suitably adjusting the proportion of the catalyst or catalysts. Depending on this proportion, the total heating period at the temperature $T_1$ to $T_2$ can, for example, be 2½ hours (speed 40% per hour) to 5 hours (speed 20%).

When the catalyst being used has characteristics such that the temperature $T_2$ is chosen to be at least 130° C., the catalyst still not being completely decomposed at the moment when this temperature is reached, it is unnecessary to use a second catalyst; such is the case, for example, with tert.-butyl perbenzoate. In the contrary case, it is expedient to add at least one co-catalyst in order to terminate the polymerization under the conditions indicated above; the second catalyst must in particular have a half-life time at the temperature $T_2$ which is greater than or equal to half the half-life time of the first catalyst at $T_1$.

The proportion of this second catalyst is such that the polymerization is practically complete after heating has taken place from 1 to 6 hours at the constant temperature $T_2$.

The proportion of the catalyst or catalysts relative to the monomer varies according to the polymerization speed which is desired; usually, the quantity of catalyst is from $5 \times 10^{-4}$ to $5 \times 10^{-3}$ active groups per mole of monomer. By active groups, there is understood a peroxy or azo group. Expressed by weight, the amounts of catalysts are generally of the order of 0.01% to 1%, and particularly 0.05%, to 0.3%. Thus, these latter proportions are generally employed in the polymerization of styrene alone, and styrene-acrylonitrile copolymers, whereas it must be increased, possibly up to about 1%, in proportion as the mixture contains more of difficultly polymerizable monomers, such as α-methylstyrene.

As non-limiting examples, in connection with the manufacture of polystyrene, impact polystyrene or styrene copolymers, it is possible to employ the catalysts, of which some are characterized, by their half-life times, in the following Table I.

Among other catalysts which can be used according to the invention, there may be mentioned: dimethyl-2,5-hexane di-2,5-perbenzoate; tert-butyl perlaurate; tert-butyl perphthalate; dicumyl peroxide; tert-butyl hydroperoxide; dimethyl-2,5-di(tert-butylperoxy)-2,5-hexyne-3; dimethyl-2,5-dihydroxyperoxy-2,5-hexane; this list does not have any limiting character.

The catalysts which are chosen are those of which the decomposition is regular at the polymerization temperatures; on the other hand, their induced decomposition, i.e., the attack of the molecule of the catalyst by the free radicals, must be small as compared with the thermal decomposition.

From this non-limiting illustration, it is understood why certain of the catalysts very commonly employed in the prior art, such as benzoyl peroxide, lauroyl peroxide, acetylbenzoyl peroxide, octanoyl peroxide, etc., or tert-butyl peroctoate, azo-bis-isobutyronitrile and others, these being compounds of which the half-life time at 100° C. is much shorter than 2 hours, cannot be suitable for carrying the invention into effect.

In general terms, the improvement according to the invention can be applied to the polymerization of materials comprising an aromatic monovinyl hydrocarbon and/or such a hydrocarbon halogenated on the nucleus; thus, it is possible to treat compounds such as styrene, vinyl-naphthalene, styrenes alkylated on the nucleus, such as ortho-, meta- or para-methylstyrene, styrenes ethylated on the nucleus, etc., orthochlorostyrene, parabromostyrene, 2-chlorostyrene, 4-methylstyrene or others, as well as various mixtures of such compounds. The aromatic vinyl monomer can be subjected to the polymerization alone or in admixture with one or more other copolymerizable monomers, as, for example, acrylonitrile, methacrylonitrile, alkyl methacrylates, for example, those of methyl, ethyl, propyl, butyl, etc., corresponding acrylates, α-alkylstyrenes, particularly α-methyl-, α-ethyl-, α-propylstyrene, para-methylstyrene, etc.

It is obvious that the reaction medium can have added thereto a chain modifier, particularly an alkyl mercaptan or carbon tetrachloride, in known manner, in a proportion sufficient for limiting the molecular weight of the polymer to the desired value.

TABLE I

Half-life times of catalysts in solution in benzene, at different temperatures

| Catalyst | Temp.°C | Half-life time hours & minutes |
|---|---|---|
| I bis(di-tert.butylperoxy-4,4-cyclohexyl)-2,2-propane | 100° | 4 H |
| | 125° | 0 h 12' |
| II tert-butyl perbenzoate | 110° | 3 h 45' |
| | 115° | 3 h |
| | 140° | 0 h 10' |
| III tert-butyl per-isononanoate | 115° | 2 h 30' |
| IV di-tert-butylperoxy-1,1-trimethyl-3,5,5-cylcohexane | 110° | 4 h |
| | 125° | 0 h 30' |
| V tert-butyl peracetate | 110° | 3 h 40' |
| | 115° | 2 h |
| | 130° | 0 h 20' |
| | 140° | 0 h 1' |
| VI di-(tert-butylperoxy)-2,2-butane | 125° | 2 h 45' |
| | 128° | 2 h 10' |
| | 145° | 0 h 30' |
| VII dimethyl-2,5-di-tert-butylperoxy-2,5-hexane | 130° | 2 h 40' |
| | 132° | 2 h |
| | 145° | 0 h 25' |
| VIII di-tert-butyl peroxide | 100° | 2h 10' |
| | 140° | 2 h |
| | 152° | 0 h 30' |

The invention is illustrated by a series of nonlimiting examples, these being preceded by the description of two control operations, carried out at least in part in accordance with the prior art.

CONTROL OPERATION 1

The polymerization of styrene is effected in the conventional manner, as particularly described in French Pat. No. 1,379,529, characterized by the use of di-tert-butyl peroxide and the prolonged heating fixed at 90° C., before the temperature is finally raised.

0.04 part of di-tert-butyl peroxide is dissolved in 100 parts by weight of styrene and the solution is dispersed in 100 parts of water, in known manner, in the presence of ionic suspension agents and a surface-active agent. The air atmosphere of the container holding this liquid is replaced by nitrogen.

The container is then heated to 90° C. for 24 hours. After this time, 30% of the styrene which is present had been polymerized. During the following 4¾ hours, the temperature is raised from 90° C. to 190° C., whereafter the suspension is kept for another 4 hours at 190° C.

Thus, in 28¾ hours, 98.6% of the initial styrene had been polymerized, the polymer which is obtained still containing 1.4% of monomer. The average polymerization speed is thus seen to be 3.44% per hour (and 1.25% per hour during the first 24 hours at 90° C.).

The polystyrene as thus obtained has a viscosity of 13 centistokes for an 8% solution in toluene, and it contains 1.4% of monomer; it can be used commercially, but its quality is not of the best.

It is important to note that the conventional method, with which a very slow polymerization (more than 28 hours) is carried out, only permits obtaining a fairly low viscosity of the polymer and leaves a relatively high content of monomer in this latter.

The present invention will be better understood by taking into account that the di-tert-butyl peroxide has a half-life period longer than 600 hours at 90° C., that is to say, much longer than the maximum of 8 hours provided for in accordance with the invention.

The excellent results to which this same catalyst can lead if it is used in the range of temperatures rising from 140° C. to 152° C., where its period varies from 2 hours to 1½ hours, will be seen in Example 9.

CONTROL OPERATION 2

The polymerization of styrene is effected by heating and with progressive raising of the temperature, according to the invention, between $T_1$ and $T_2$, but $T_1$ is lower than 100° C., as in the prior art.

The styrene suspension is prepared in the conventional manner, by the addition to water of suspension agents of the ionic type, associated with a small quantity of surface-active agents.

For 100 parts by weight of water, there are used:
100 parts of styrene
0.3 parts of benzoyl peroxide
0.05 parts of tert-butyl peracetate.

As the half-life time of the benzoyl peroxide is only from 2 to 3 minutes at 115° C., and that of the tert-butyl peracetate is 2 hours, the temperature range from 80° C. to 115° C. is adopted for the polymerization, as in the majority of the known processes.

With the suspension having quickly been brought to 80° C., the temperature is caused to rise progressively and linearly up to 115° C. in 5 hours; the speed of polymerization is thus 20% per hour.

The medium is then maintained for 2 hours at 115° C.

The reactor is then rapidly cooled, and the polymer obtained is treated by the known methods, which comprise washing, suction-filtering, drying and like operations.

The polymer thus prepared has a viscosity of 11 centistokes in 8% toluene solution; its content of residual styrene is 0.2%.

It is seen that, despite the low polymerization speed of 20% per hour, the product which is obtained has a viscosity which is too low to be suitable for all present-day commercial uses.

On the other hand, it is to be noted that it would not have been possible to polymerize more quickly, starting, for example, at 100° C. instead of 80° C., because then the benzoyl peroxide would have been composed too quickly and only one-fifth of the styrene would have been polymerized.

EXAMPLE 1

A polymerization of styrene is carried out in suspension, in accordance with the following formula:
100 parts by weight of styrene
0.1 to 0.3 part by weight of a first catalyst; bis(ditert-butylperoxy-4,4-cyclohexyl)-2,2-propane (I in Table I)

0.025 to 0.075 part by weight of a second catalyst: di(tert-butylperoxy)-2,2-butane (VI in Table I)
0 to 0.2 part by weight of tert-dodecyl mercaptan.
The styrene having dissolved the additives is dispersed in 100 parts by weight of water containing conventional suspension agents as in Control Operations 1 and 2.

The half-life times of the catalysts are given in Table I under I and VI.

Once the reactor has been charged with the suspension at 50° C., the temperature of the suspension is brought to $T_1 = 100°$ C. within 1 hour; then a continuous substantially linear rise in temperature is carried out up to $T_2 = 125°$ C., during a time which is set forth below for each of 3 series of polymerization. After that time, the suspension is kept at 125° C. for 1 hour. The reactor is then cooled as quickly as possible and the polymer which is obtained is treated in accordance with the known methods (washing, suction-filtering, drying).

Three polymerization series are carried out under the following conditions.

| Series No. | 1 | 2 | 3 |
| --- | --- | --- | --- |
| 1st catalyst % | 0.1 | 0.2 | 0.3 |
| 2nd catalyst % | 0.025 | 0.05 | 0.075 |
| Degree of polymerization | | | |
| up to $T_1$ | 6% | 6% | 6% |
| up to $T_2$ | 98% | 98% | 98% |
| Time of heating from $T_1$ to $T_2$ | 4 h 15' | 3 h 15' | 2 h 45' |
| Average polymerization rate between $T_1$ and $T_2$ in % per hour | 21.6 | 28.3 | 33.5 |

In each of the runs, the total degree of polymerization after the final heating of 1 hour at 125° C. was almost 100% (only 0.04% of monomer remained in the polymer).

Attached diagram illustrates the variations of temperature (T) and polymerization degrees (P) during the operation of series 2 as a function of time. In this diagram characteristic points, respectively $T_0$-$T_1$ - $T_2$ and O - $P_1$ - $P_2$, are joined by straight lines; that means, each point of the diagram gives the average value of temperature and polymerization degree at the given time. As concerns temperature, the lines approximately illustrate true values, since raising from $T_1$ to $T_2$ is just carried out progressively, continuously and substantially linearly. As to the values of P (polymerization degrees) they may vary in fact following a certain curve, but that is immaterial for the method of the invention, it being that the extreme points $P_1$ and $P_2$ of the curve exactly coincide with those of the dotted straight lines of the diagram.

On the other hand, in each series, the proportion of transfer agent, TDM, is caused to vary from 0 to 0.20%.

The molecular weight of the products which are obtained is evaluated by the viscosity at 8% in toluene at 25° C., in centistokes. This viscosity varies as follows with the concentration of TDM.

| | Concentration in TDM % | | | | | | |
| --- | --- | --- | --- | --- | --- | --- | --- |
| | 0 | 0.02 | 0.05 | 0.08 | 0.10 | 0.15 | 0.20 |
| | | | VISCOSITIES | | | | |
| Series No. 1 | 39.8 | 30 | 20.4 | 16.2* | 12.8 | 9.1 | 7.4 |
| Series No. 2 | 25.4 | 20.3 | 15.5 | 12.0 | 10.0* | 8.2 | 7.4 |
| Series No. 3 | 17.4 | 12.0 | 11.1 | 9.4 | 8.5 | 7.5 | 7.4 |

Investigation of the mechanical and rheological properties shows that: the products with a viscosity equal to or higher than 14.5 centistokes are capable of being used as a quality known as the "heat" quality, while those of which the viscosity is between 14.5 centistokes and 9.5 centistokes correspond to the commercial quality known as "fluid" quality.

It is thus seen that it is possible by this process to produce the usual "fluid" and "heat" commercial products at a speed of about 21% to 34% per hour.

The following Table gives the properties of the two products of the preceding Table, marked with an asterisk, by comparison with the conventional commercial products.

| Properties | "Heat" product conventional | Invention: product "16.2 csk" | "Fluid" product conventional | Invention: product "10 csk" |
| --- | --- | --- | --- | --- |
| Viscosity at 8% in toluene, centistokes | 18.0 | 16.2 | 14.0 | 10.0 |
| % of residual monomer | 0.10 | 0.04 | 0.2 | 0.04 |
| tensile strength kg/cm² | 560 | 580 | 470 | 490 |
| Dynstat flexure strength kg/cm² | 1,070 | 1,170 | 820 | 850 |
| Charpy impact kg/cc | 16.0 | 22.8 | — | — |
| Dynstat kgcm/cc | — | — | 5.6 | 7.0 |
| bending temperature under reduced load | 90 | 90 | 83 | 84 |

This Table shows that the products obtained according to the present invention have properties which are even better than those of the conventional commerical products, while having been manufactured with a much faster polymerization.

EXAMPLE 2

A styrene polymerization series in aqueous suspension is carried out with addition of:

tert-butyl per-iso-nonanoate, 1st catalyst (III in Table I)

dicumyl peroxide, 2nd catalyst

TDM of which the proportions by weight per 100 of styrene are hereinafter indicated.

Once the reactor is charged, the temperature is brought within about 1 hour to $T_1 = 115°$ C. The temperature is then increased linearly up to $T_2 = 130°$ C. After 1 hour at 130° C., the polymer is treated in the known usual manner.

| Series | 1st catalyst % | 2nd catalyst % | Duration of heating from $T_1$ to $T_2$ hours and minutes |
| --- | --- | --- | --- |
| 4 | 0.150 | 0.050 | 4 h 00' |
| 5 | 0.225 | 0.075 | 3 h 15' |

The content of residual styrene is from 0.04% to 0.08%.

In each series of experiments, the proportion of transfer agent, TDM, is also varied from 0% to 0.3%. The molecular weight of the products as thus obtained is expressed as the viscosity of an 8% solution in toluene at 25° C., in centistokes.

| Concentration of TDM % | | | | | | |
|---|---|---|---|---|---|---|
| Series No. | 0 | 0.025 | 0.050 | 0.100 | 0.200 | 0.300 |
| | | | VISCOSITY | | | |
| 4 | 16.4 | 13.0 | 11.5 | 9.2 | 6.7 | 5.5 |
| 5 | 13.0 | 10.7 | 9.7 | 8.4 | 6.5 | 5.5 |

Investigation of the mechanical and rheological properties shows that the products with a viscosity equal to or higher than 13 centistokes corresponds to the quality known as "heat" quality. Between 13 and 9 centistokes, there is obtained the quality known as "fluid" quality. These products are then lubricated by incorporation of mineral or other oils.

EXAMPLE 3

The polymerization was carried out with a suspension containing, to 100 parts of water, 100 parts of styrene and, respectively, 0.1     0.15     and 0.2% of tert-butyl perbenzoate (II in Table I).

The proportions of TDM were 0 – 0.015, 0.05 to 0.1 and 0.2% for each of the three concentrations of catalyst.

The polymerization started at $T_1 = 115°$ C. and the temperature was immediately increased linearly up to $T_2 = 140°$ C. This latter temperature was maintained for 1 hour.

The heating periods from $T_1$ to $T_2$ are, respectively:

3 h 15 min.     2 h 25 min.     and 2 h 30 min.

The mechanical and rheological properties of the products obtained are the same as those of Example 2.

EXAMPLE 4

In the suspension of the preceding Examples, the catalysts are replaced by:

0.12% of di-tert-butylperoxy-1,1-trimethyl-3,5,5-cyclohexane as 1st catalyst (IV in Table I);

0.05% of di(tert-butylperoxy)-2,2-butane as 2nd catalyst (VI in Table I).

Taking into account the half-life time of the two catalysts, temperatures of $T_1 = 110°$ C. and $T_2 = 125°$ C. are adopted.

The reaction is carried out during a linear rise in the temperature in 3 hours from 110° to 125° C.

The polymerization is completed by keeping the temperature for 1 hour at 125° C.

The viscosity, in 8% solution in toluene, of the product which is obtained is 29.1 centistokes. The residual monomeric styrene is 0.05%.

EXAMPLE 5

The aqueous suspension to be polymerized contains:

| styrene | 79 | parts |
|---|---|---|
| acrylonitrile | 21 | parts |
| antioxidants | 0.4 | part |
| t-butyl peracetate | 0.1 | part |
| | | (V in Table I) |
| dimethyl-2,5-di-tert-butyl peroxy-2,5-hexane | 0.04 | part |
| | | (VII in Table I) |
| tert-dodecyl mercaptan | 0.1 | part |

Once the product is in suspension, the reactor is closed and it is quickly brought to $T_1 = 110°$ C. The temperature is increased linearly up to 130° C. ($T_2 = 130°$). The suspension is kept for 1 hour at this latter temperature. The heating has lasted altogether 3 hours and 15 min.

The product which is obtained and brought into a solution of 0.8 g per liter of dimethyl formamide at 34.4° C. had a viscosity of 1.49 centistokes.

This product had excellent qualities and even had a thermal stability better than the known copolymers of the same type.

EXAMPLE 6

Example 4 is repeated, but with the batch:

| styrene | 100 parts |
|---|---|
| t-butyl peracetate | 0.15 part (V in Table I) |

Taking into account the thermal stability of the initiator, temperatures of $T_1 = 115°$ C. (half-life: 2 hours) and $T_2 = 140°$ C. (half-life: 1 minute) are adopted. The suspension is heated from 50° to 115° C. in 1 hour, and when 115° C. are reached, 6% of the initial styrene was polymerized; the reaction is carried out during a linear temperature rise from 115° C. to 140° C. over 3 hours; reaction speed is 30% per hour and the total degree of polymerization reached was 96%. Then the temperature is kept for 1 hour at 140° C. to complete the polymerization.

The viscosity at 8% in toluene of the product which is obtained is 16.3 centistokes.

EXAMPLE 7

The suspension to be polymerized contains, per 100 parts of styrene:

0.075 part of di(tert-butylperoxy)-2,2-butane
with $T_1 = 128°$ C.     (half-life: 2 hours 10 min.)
and $T_2 = 145°$ C.     (half-life: 0 hour 30 min.).

The suspension is heated from 50° C. to 128° C. within 1 hour 10 minutes and, after this period, 8% of initial styrene was polymerized. The duration of the linear rise from 128° to 145° C. is 2 hours; then, the polymerization degree is 84% which means that the rate of polymerization between 128° and 145° C. was of 38% per hour. The viscosity at 8% of the product which is obtained is 14.7 centistokes. It is just sufficient to achieve the commercial range of the polystyrenes.

EXAMPLE 8

The suspension to be polymerized contains, per 100 parts of styrene:

0.05 part of dimethyl-2,5-di-t-peroxy-2,5-hexane
with $T_1 = 132°$ C.     (half-life: 2 hours)
and $T_2 = 145°$ C.     (half-life: 0 hour 25 min.).

The duration of heating from 50° to 132° C. is 1 hour 10 minutes, and the polymerization degree at this stage was 8%. Then, the temperature is raised from 132° to 145° C. in 3 hours 50 minutes with a rate of polymerization of 23.5% per hour, the total conversion into polymer being 98%.

The viscosity at 8% of the product which is obtained is 22.1 centistokes, which makes it possible to manufacture all the commercial polystyrenes.

EXAMPLE 9

The suspension to be polymerized contains, per 100 parts of styrene:

0.05 part of di-t-butyl peroxide
with $T_1 = 140°$ C. (half-life: 2 hours)
and $T_2 = 152°$ C. (half-life: 0 hour 30 min.).

Heating from 50° to 140° C.: 1 hour and 5 minutes (i.e., 83° C. per hour). 8% of monomer was polymerized at that stage. Period of heating from $T_1$ to $T_2$: 2.5 hours, the average polymerization rate during this period being 35% per hour. The total degree of polymerization was 95.5% at the end of the period.

The 8% viscosity of the product which is obtained is 15.4 centistokes, making it possible to manufacture all the commercial polystyrenes.

EXAMPLE 10

In a preparation of "impact" polystyrene, there are first of all formed six batches, each formed by:
 100 parts of styrene
 7 parts of polybutadiene ("Diene-35" type of Firestone)
 0.2 parts of polygard antioxidant
 3 parts of mineral oil.

One of these batches is left without transfer agent, while the five others have added thereto, respectively, 0.025, 0.05, 0.1, 0.2 and 0.3 part of TDM.

After dissolving the polybutadiene in the styrene, each batch is subjected to thermal prepolymerization at 120° C., until 30% of the monomer is polymerized.

In each case, the prepolymer as thus formed is poured into a reactor containing an aqueous phase, prepared with the object of the suspension polymerization.

After the prepolymer has been brought into suspension, 3 series of tests are carried out with the following catalysts I and II, of which the proportions are specified later.
 I — bis(di-t-butylperoxy-4,4-cyclohexyl)-2,2-propane (I in Table I)
 II — di(t-butylperoxy)-2,2-butane (VI in Table I).

The closed reactor is quickly brought to the temperature $T_1 = 100°$ C., within 1 hour 5 minutes, and at this stage 9% of the suspended styrene was polymerized.

The heating is then regulated so that the temperature rises progressively and linearly, for a period which is indicated below, up to $T_2 = 125°$ C.

When the temperature of 125° C. is reached, the suspension is kept stirred for 1 hour.

The characteristics of these 3 polymerization series are:

| Series No. | 1 | 2 | 3 |
|---|---|---|---|
| Catalyst I — % | 0.088 | 0.176 | 0.264 |
| Catalyst II — % | 0.011 | 0.022 | 0.033 |
| Period of heating from 100° C. to 125° C. | 3 h 15' | 2 h 30' | 2 h |
| Polymerization rate in % per hour, between 100° & 125° C. | 26.5 | 33.4 | 43.0 |
| Total heating time | 5 h 20' | 4 h 35' | 4 h 05' |

Each of these series led to 6 products of different average molecular weights being obtained, depending on the content of TDM in the prepolymer. These products are characterized below by the viscosities in centistokes at 25° C. of their 8% solutions in toluene.

| % TDM: | | 0 | 0.025 | 0.05 | 0.1 | 0.2 | 0.3 |
|---|---|---|---|---|---|---|---|
| viscosities centistokes | | | | | | | |
| Series No. | 1 | 48.9 | 32.9 | 22.3 | 18.6 | 15.6 | 11.4 |
| do. | 2 | 40.4 | 25.4 | 21.0 | 16.0 | 10.5 | 8.6 |
| do | 3 | 33.2 | 21.1 | 16.7 | 12.2 | 8.2 | 5.4 |

Among the products which are obtained, those of which the viscosities range between approximately 17 and 25 centistokes are perfectly well suitable for being used for the extrusion of commercial impact polystyrenes; the viscosities from 11 to 17 centistokes are very suitable for injection.

It is thus seen that the process according to the invention makes it possible for all the commercial range of impact polystyrenes to be produced much more quickly than in the past.

EXAMPLES 11 to 16

Following the general procedure of Example 1, a series of polymerizations were carried out with varying catalysts, durations, temperatures and some other conditions. The particulars of these runs are set forth below. As can be seen, very high degrees of polymerization are obtained when the temperature reaches $T_2$, and substantially complete polymerization is performed within less than 6 hours.

In the following Table:
 $T_o$ is the temperature of the suspension when the heating to $T_1$ is started;
 $T_1$ and $T_2$ as above defined;
 v designates the velocity of heating from $T_o$ to $T_1$ in °C. per hour;
 $t_{o-1}$ is the time of heating from $T_o$ to $T_1$;
 $t_{1-2}$ is the time of heating from $T_1$ to $T_2$;
 s designates the speed of heating from $T_1$ to $T_2$ in °C. per hour;
 $P_1$ is the degree of polymerization when $T_1$ is reached (% of initial monomer);
 $P_2$ is the total degree of polymerization when $T_2$ is reached (% of initial monomer);
 $(P_2-P_1)/t_{1-2}$% shows the average rate of polymerization between $T_1$ and $T_2$;
 $t_2$ is the time of final heating at constant $T_2$ for completing polymerization, i.e., for reaching substantially 100% of total polymerization degree.

The catalysts and other additives used in the Examples were:

No. 11 — 0.2 % bis(di-t-butylperoxy-4,4-cyclohexyl)-2,2-propane
0.05% 2,2-di(tert-butylperoxy)-butane
0.05% tert-dodecyl mercaptan (TDM)
20 ppm of inhibitor tert-butyl-catechol being present in the starting styrene.

No. 12 — as No. 11 but 10 ppm only of inhibitor.

No. 13 — 0.15% tert-butyl perbenzoate
0.05% dicumyl peroxide
0.05% TDM.

No. 14 — 0.2 % tert-butyl perbenzoate
0.1 % TDM.

No. 15 — 0.12% tert-butyl peracetate
0.05% 2,2-di(tert-butylperoxy)-butane
no TDM.

No. 16 — 0.15% tert-butyl peracetate
0.04% 2,5-dimethyl-2,5-di(tert-butylperoxy)-hexane
0.10% TDM

| EXAMPLE NO. | 11 | 12 | 13 | 14 | 15 | 16 |
|---|---|---|---|---|---|---|
| $T_0$ °C. | 50° | 25° | 50° | 50° | 50° | 50° |
| $T_1$ °C. | 100° | 100° | 115° | 115° | 110° | 110° |
| Time $t_{0-1}$ | 1 h | 1 h | 1 h | 1 h | 1 h | 1 h |
| v °C./h | 50 | 75 | 65 | 65 | 60 | 60 |
| $T_2$ °C. | 125° | 125° | 135° | 135° | 125° | 130° |
| Time $t_{1-2}$ | 3.25 h | 3.5 h | 3 h | 3.25 h | 3 h | 2.5 h |
| s °C./h | 7.68 | 7.15 | 6.67 | 6.15 | 5.00 | 8.00 |
| $P_1$ % | 0 | 3 | 6 | 6 | 6 | 6 |
| $P_2$ % | 97 | 98 | 95.5 | 99 | 86 | 82 |
| $\frac{P_2-P_1}{t_{1-2}}$ % | 29.9 | 27.1 | 29.8 | 28.6 | 26.6 | 30.4 |
| $t_2$ h | 1 h | 1 h | ¾ h | 1 h | ½ h | 1 h |

We claim:

1. A process for the production of high molecular weight polystyrene, which comprises:
   a. forming an aqueous suspension of styrene and a total of 0.01 to 1 weight percent catalyst, said catalyst being one or a mixture of free radical organic peroxy or azo compound catalyst, exerting a polymerization rate, at a first polymerization temperature $T_1$ of 100° to 150° C., which is 2 to 20 times higher than the thermal polymerization at such temperature, the most unstable catalyst in the suspension being present in an amount of 40–100% of total catalyst and having a half-life of 2 to 8 hours at $T_1$;
   b. rapidly heating the suspension to said first polymerization temperature $T_1$;
   c. when at least 1% and before 10% of the styrene has been polymerized, raising substantially linearly the temperature of the suspension to a second polymerization temperature $T_2$ of 120° to 160° C. and which is at least 12° C. above the $T_1$ temperature and at which temperature the most unstable catalyst in the suspension has a half-life of less than 1 hour; and
   d. regulating the temperature rise from $T_1$ to $T_2$ for a time sufficient to allow at least 75% of the styrene to be polymerized when the temperature $T_2$ is reached, the velocity of heating the suspension during said time being such that the polymerization rate is about 20% to about 50% per hour; wherein the total polymerization time is less than 6 hours.

2. Process according to claim 1, wherein the velocity of the rapid heating to said first temperature $T_1$ is 20° C to 100° C per hour.

3. Process according to claim 2, wherein said velocity is 40° C to 90° C per hour.

4. Process according to claim 1, wherein at least 90% of styrene is polymerized when said second temperature $T_2$ is reached.

5. Process according to claim 1, wherein the average rate of temperature rise from $T_1$ to $T_2$ is 3° C to 15° C per hour.

6. The process of claim 1, wherein the most unstable catalyst at the temperature $T_1$ has a half-life of 2½ to 6 hours.

7. The process of claim 6, wherein the most unstable catalyst at temperature $T_2$ has a half-life of from 2 to 30 minutes.

8. The process of claim 1, wherein the aqueous suspension of styrene contains a total of 0.05 to 0.3 percent catalyst.

9. The process of claim 8, wherein the catalyst is a mixture of two free radical catalysts.

10. Process according to claim 1, wherein the polymerization is completed by maintaining the suspension at said temperature $T_2$ for ½ to 3 hours.

* * * * *